Patented Dec. 16, 1930

1,785,461

UNITED STATES PATENT OFFICE

DELASKA E. SEAWARD, OF OKLAHOMA CITY, OKLAHOMA

ART AND PROCESS OF PRESERVING EGGS

No Drawing.    Application filed May 31, 1928.   Serial No. 282,048.

My invention relates to the process of preserving eggs by a treatment of the eggs, or by a treatment of the containers for the eggs and the application of such containers on or over the eggs.

The object of my invention is to produce a new and useful art or process of treating the eggs or the containers in which they are kept, which will be new, simple, cheap, easily applied, easily handled, and useful; which will exclude the light from contacting and entering the egg shell; which will exclude germs and bacilli from entering into the egg or through the containers in which they are kept; which will exclude the air from entering the shell and the egg after treatment thereto, or after being encased in the container; which will preserve the egg for use approximately indefinitely; which includes a treatment to the paper, cartons, wrappers, or other suitable containers for the eggs, or to the eggs themselves; which will render the treated eggs easy of handling and shipping; which will prevent decay and spoiling of the eggs; which will add little, or no weight to the eggs when treated, and enable them to be cheaply shipped and handled; which will be efficient for all of the purposes for which it is intended.

The means now in use for the claimed purposes for which my invention is also claimed have various serious drawbacks, and objections: Some of them require considerable weight to be added, thereby adding to the cost of handling and shipping; some of them are hard to be completely and properly applied to the egg and necessitate the breaking and loss of a larger percentage of the eggs handled; others require more or less cold storage, and necessitate larger expense thereby, and an additional expense also for the additional handling incident to such cold storage; some of them require burying of the eggs and keeping them in dark places, or both; eggs having once been subject to cold storage will thereafter spoil more quickly when withdrawn therefrom; others have the effect of causing the egg to take up and absorb odors, and result in producing a bad taste in the meat of the eggs; all of them have the objection of admitting either air, or light, or both.

All of the above objections are obviated by my invention.

Instead of depending solely on the agency of excluding the air from contact with the shell of the egg, I depend partially on that. But it is known to those familiar with the art to which my invention pertains that the germ, or bacilli, which causes the spoiling or decaying of the egg may enter into the egg shell at the same time as and with the rays of light. It is also known that eggs exposed to the light, heat and air will spoil more quickly than those not so exposed. This is likely owing to the light, heat and air forming a field for the better propagation of germs, bacilli, and the like. It is also known by those familiar with the art that no living germ can go through or penetrate a suitable substance properly treated with silver nitrate. I therefore employ a paper of a suitable consistency and of a size suitable for enclosing and wrapping the usual egg therewithin, and of sufficient size for twisting the four corners thereof together. Said paper, or other suitable material, is treated with a solution of silver nitrate, thus keeping out the rays of light and the heat and preventing the entrance of germs and bacilli. Any proportion desired may be used; but it has been found sufficient in actual experience that a solution of from 1% to 2% of silver nitrate to 98% to 99% of water is ample. This has the effect of turning black, or approximately black, the paper and when applied entirely excludes the light and excludes any living germs or bacilli from penetrating therethrough. The thorough wrapping of the egg in one of these and twisting the four corners of the treated paper tightly together approximately prevents the entering of air to egg. This will allow the egg to be shipped and handled in the usual manner without requiring cold storage, or the like, and without requiring them to be kept in the dark. The treatment may also be applied to the cartons and other wrappers used for containers for the eggs, and when so properly treated and used will entirely shut out the light from entering and contacting the egg; and will prevent the decay germ or bacilli from entering alive through the material thus treated with the silver nitrate.

The prepared and treated paper ready for use may be easily, cheaply and readily shipped to various places for use in pads, boxes, or the like, and be instantly ready for application to the eggs when fresh and ready for being temporarily stored, or stored, for future use.

While I have described a manner of treatment and the form of the solution, I do not want to be considered as making my description as restrictive, but as illustrative. I desire to reserve the right to change the form and contents and sizes of the containers, and the proportion of the solution as desired within the scope of my invention without departing from the spirit or principle of my invention, or sacrificing any of the advantages thereof.

Having described the art and process, I claim:

1. The art and process of preserving eggs in good condition consisting in subjecting suitable wrapping material to a solution of silver nitrate and water, then permitting it to dry, then wrapping a suitably sized portion of same around the egg, then twisting the corners together thereby shutting out the light, air, germs and bacilli.

2. The art and process of preserving eggs in good condition consisting in subjecting suitable wrapping material to a solution of approximately from 1% to 2% silver nitrate and approximately 98% to 99% water, then permitting said bathed material to dry, then wrapping a suitably sized portion thereof around an egg, then suitably fastening the corners of said material together for precluding air, light, germs and bacilli from reaching said egg.

3. The art and process of preserving eggs in good condition, consisting in subjecting suitable containers therefor to a solution of silver nitrate and water, and then suitably packing the eggs therein.

4. The art and process of preserving eggs in good condition, consisting in subjecting suitable containers therefor to a solution of from 1% to 2% silver nitrate and from 98% to 99% water, and then suitably packing the eggs therein.

DELASKA E. SEAWARD.